Dec. 18, 1945.  J. ANCHOR  2,391,287
FOOD DISPENSING SYSTEM AND APPARATUS
Filed Nov. 8, 1943  2 Sheets-Sheet 2
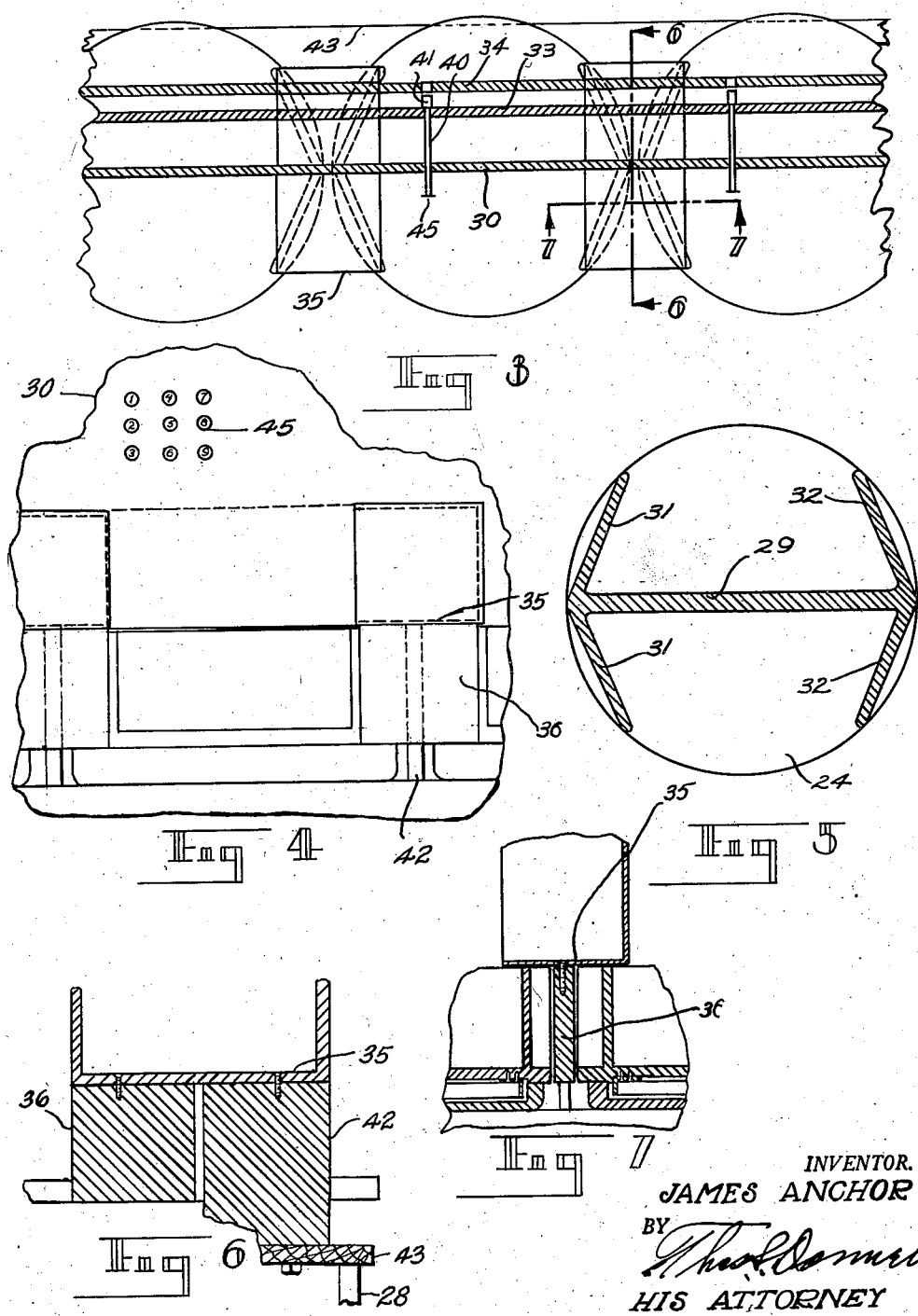
INVENTOR.
JAMES ANCHOR
BY
HIS ATTORNEY

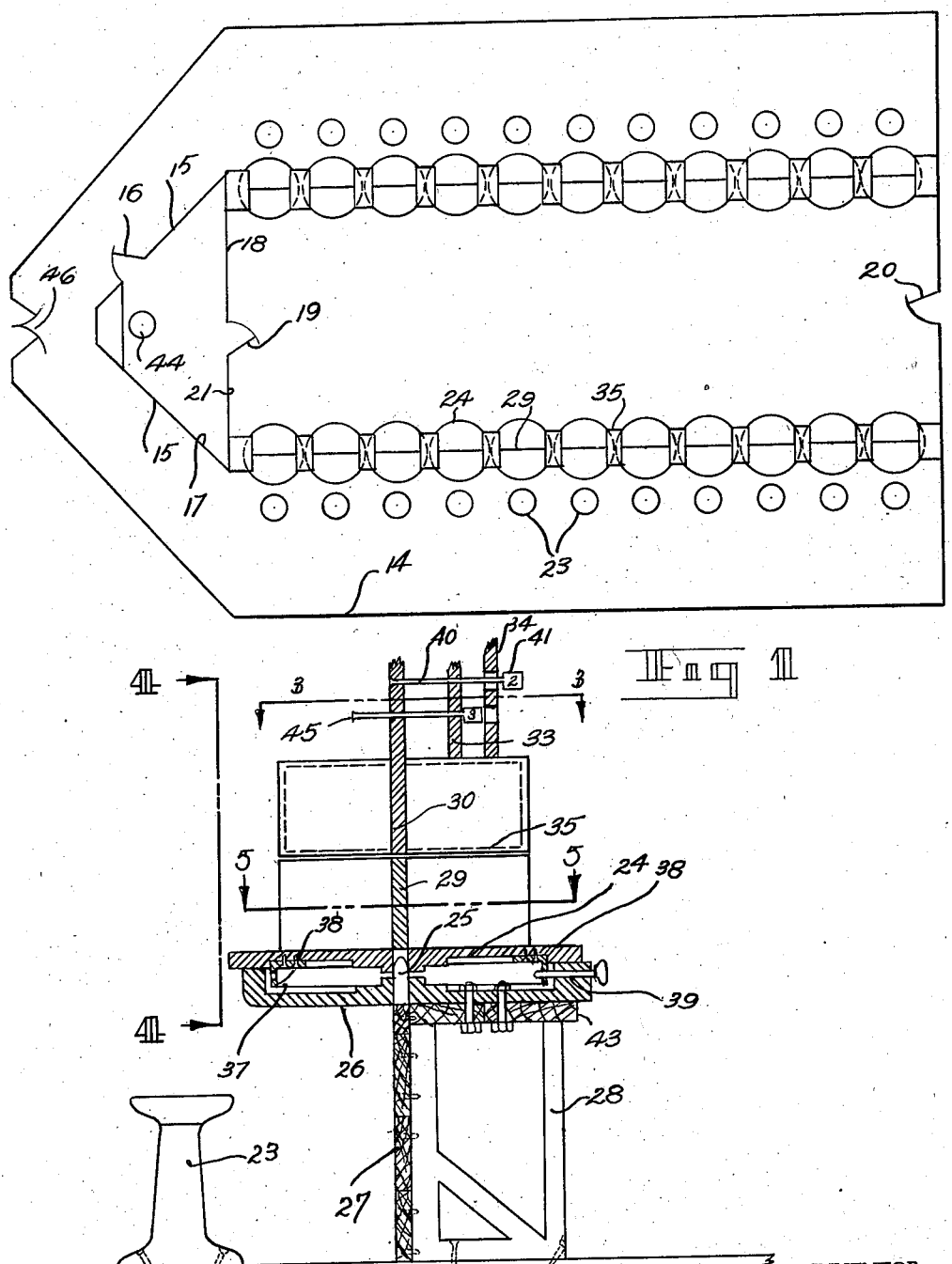

Patented Dec. 18, 1945

2,391,287

UNITED STATES PATENT OFFICE 2,391,287

FOOD DISPENSING SYSTEM AND APPARATUS

James Anchor, Detroit, Mich., assignor to Ella Anchor, Detroit, Mich.

Application November 8, 1943, Serial No. 509,529

5 Claims. (Cl. 186—1)

My invention relates to a new and useful improvement in a food dispensing apparatus adapted for use in public eating places. It is an object of the present invention to provide an apparatus having a plurality of stations at each of which a person may be served with and eat meals and which may be kept clean of used dishes.

Another object of the invention is the provision of a construction so arranged that it may be rotated on its mountings so that when a customer has finished a meal and left used dishes on one side of the structure the apparatus may be rotated to present an unused surface and convey the used dishes to the rear where they will be out of sight of the customer and accessible to the operators of the establishment.

Another object of the invention is the provision of an apparatus for dispensing food, having a front side at which a customer may sit and a rear side behind which the attendants are stationed out of view of the customers and provided with a means whereby the attendant may place prepared meals in position of accessibility to the customer who may remove them and place them upon the supporting table.

Another object of the invention is the provision in an apparatus of this kind of a plurality of separate tables, each divided into two sections and rotatably mounted so that either section may be presented to the customer for use while the other section is concealed from the customer's view.

Another object of the invention is the provision in an apparatus of this kind of a plurality of individual tables, each rotatably mounted and divided into a pair of sections so that each section may be presented individually to the customer for use while the other section is concealed from the customer's view and accessible to attendants for removing used dishes therefrom, and having associated therewith a container, positioned above and not interfering with the rotation of the table, in which the attendant may place the food or prepared dishes and from which the customer may readily remove them from deposit on the table.

Another object of the invention is the provision in an apparatus of this kind of means whereby the customer sitting at one side of the apparatus concealed from the attendants at the other side may indicate to the attendants by proper indicating means the articles or dishes which the customer desires.

It is another object of the present invention to provide a food dispensing apparatus having a plurality of individual serving tables, all so constructed and arranged that the attendants are hidden from the view of the customers while the customer is enabled to be quickly served and to indicate the articles which he wishes to be served.

Another object of the invention is the provision in an apparatus of this kind of individual tables, each divided into a pair of sections and each rotatably mounted and each provided with means whereby the attendant may lock the table against rotation.

Other objects will appear hereinafter.

In the disclosure I have illustrated a practical application of my invention and structure embodying it but it is recognized that variations and modifications may be made in the structure disclosed and it is intended that variations and modifications thereof may be embraced within the scope of the claims which form a part hereof.

Forming a part of this specification are drawings in which Fig. 1 is a diagrammatic view illustrating the invention.

Fig. 2 is a diagrammatic view showing a part of the invention in section.

Fig. 3 is a fragmentary sectional view taken on line 3—3 of Fig. 2.

Fig. 4 is a fragmentary elevational view taken on line 4—4 of Fig. 2.

Fig. 5 is a sectional view taken on line 5—5 of Fig. 2.

Fig. 6 is a fragmentary sectional view taken on line 6—6 of Fig. 3.

Fig. 7 is a fragmentary sectional view taken on line 7—7 of Fig. 3.

In the diagrammatic view I have illustrated by the border line 14 a room in a building with the railing 15 having an entrance door 16 leading to an alcove or space 17 and formed through the railing 18 is a door 19. The particular arrangement described is optional and in itself forms no part of the invention. A rear door 20 to permit access to the space 21 in which the attendants work and in which the necessary equipment is installed.

A plurality of stools or seats 23 is provided, each stool being positioned opposite an individual table. The table construction embodies a table top 24 pivotly mounted by the pivot pin 25 on the supporting plate 26 which is supported by the wall 27 and the supporting standard 28 embodying the supporting plate 42. Extended diametrically across the table top 24 is a partition 29. The table top is adapted to project inwardly of the space 21 below the wall 30 so that substantially half of the table top 24 is positioned on one side of the wall 30 and half on the other side. Side boards 31 and 32 project outwardly from opposite ends of the partition 29. Positioned inwardly from the wall 30, and spaced therefrom and spaced from each other are walls 33 and 34.

Mounted on the walls 30, 33 and 34 at each of the table tops 24, and positioned above the same, is a food receptacle 35 which is a box-like structure open at one side. This box-like structure or receptacle 35 constitutes a service shelf and is supported stationary on the walls 30, 33 and 34 sufficiently elevated above the table top to permit the clearance of the parts 29, 31 and 32 when the table top is rotated, so that no interference with the rotation of the table top is present. The open side of this box-like structure or individual service shelf is faced toward one of the table tops so that a box-like structure or receptacle 35 is provided for each rotatable table top. Supporting the rear end of the receptacle 35 is a partition 42 which projects upwardly from and is supported by the supporting plate 43. The walls 33 and 34 are cut away sufficiently so that the attendant positioned in the space 21 may deposit food in this receptacle 35 and a person sitting on the stool 23 will have access thereto so as to be able to remove it and place it upon the table top 24. Since this box-like structure is open only at one of the vertical sides and the structure extends on both sides of the walls 30, 33 and 34, which are cut away just sufficiently to allow the mounting of the box in position, it is obvious that an attendant in the space 21 would not be visible to a customer occupying a stool 23. A filler block 36 is positioned beneath the food receptacle 35 so as to close the space between adjacent table tops 24.

Mounted on the under surface of each of the table tops 24 is a metallic ring 37, having openings 38 formed therein into which may be projected the plunger 39.

The construction is such that when a customer has finished eating and has left the station the attendant may, by retracting the plunger 39 rotate the table top so as to bring the used section of the table top inwardly to the space 21 and expose the unused portion of the table top for subsequent use. In this way the attendant may quickly remove used dishes from the sight of the customers and present the unused portion of the table.

Slideably mounted in the walls 30, 33 and 34 are rods 40 and 45, each carrying on its inner end an enlarged portion 41 on which suitable indicia is displayed. The indicia on the members 41 may be in the form of numbers or words indicating different dishes which are available for serving. The customer, after looking over the menu, would press inwardly the proper rods 40 to indicate to the attendant at the other side of the wall 34 the dishes desired and place a check, which he receives from the cashier on entering, in the food receptacle. The attendant would then pick up the check and place the dishes ordered in the food receptacle 35 accessible to the person occupying the table. When the person occupying the table has finished his meal he would then press in another rod 40 carrying indicia indicating that he desires his check or bill. The attendant, noticing this indicator, would then place the punched check or tabulated bill on the unused portion of the table top and then retract the plunger 39 and rotate the table top. This would bring the unused portion of the table top to position of use, and the customer would have access to his check.

In Fig. 1, I have indicated a cashier's station 44 and an entry door 46.

By this construction, I have provided a simple and effective means for removing used dishes from the sight of other customers, thus maintaining a clean and sightly appearance in a food dispensing place.

What I claim as new is:

1. In an apparatus of the class described, a vertically directed supporting structure; a supporting plate supported by said supporting structure in elevated relation; a table top mounted on said supporting plate and rotatable thereon; means on said table top for dividing said top into a pair of sections, the rotation of said table top effecting a presentation of either of said sections into position for use while removing the other section to a position concealed from the user; stationary wall-forming members projecting upwardly from said table top; a box-like structure open at one side mounted on said wall-forming members above the table top, one end of said box-like structure being positioned on one side of said wall-forming members and the other end on the other side.

2. In an apparatus of the class described, a vertically directed supporting structure; a plurality of spaced apart supporting plates mounted on said structure in elevated relation and positioned in the same horizontal plane; a table top rotatably mounted on said supporting structure at each of said supporting plates; a stationary wall projecting upwardly of said table tops; a box-like receptacle open at one side mounted on said wall above each of said table tops adjacent the edge thereof and projecting at one end on one side of said wall and at the other end on the other side of said wall.

3. In an apparatus of the class described, a plurality of spaced apart rotatably mounted table tops positioned in a row; means on each of said table tops for dividing the top into a pair of sections, said top and said dividing means being rotatable for presenting either of said sections into position for use while removing the other section into position concealed from the user; a wall extending upwardly from the table top substantially diametrically thereof and a box-like structure open at one side mounted on said wall at each of said table tops and having one end positioned on one side of said wall and the other end on the other side of said wall.

4. In an apparatus of the class described, a vertically directed supporting structure; a rotatable table top mounted on said structure in elevated relation; means for dividing said top into a pair of sections, the rotation of said top effecting a movement of one of said sections to a position of use while simultaneously removing the other section to a position of non-use; means for securing said top in held position; a wall projecting upwardly from said top; a box-like receptacle mounted on said wall above said top and open at one side and closed at its ends, one of said ends being positioned on one side of said wall and the other of said ends on the other side.

5. In an apparatus of the class described, a vertically directed supporting structure; a rotatable table top mounted on said structure in elevated relation; means for dividing said top into a pair of sections, the rotation of said top effecting a movement of one of said sections to a position of use while simultaneously removing the other section to a position of non-use; means for securing said top in held position; a wall projecting upwardly from said top; a box-like receptacle mounted on said wall above said top and open at one side and closed at its ends, one of said ends being positioned on one side of said wall and the other of said ends on the other side; and movable means mounted on said wall accessible to a person on one side thereof for indicating, when moved to a certain position, to the person on the other side of said wall articles desired by a person moving the same.

JAMES ANCHOR.